US011950298B2

(12) United States Patent  
Miura et al.

(10) Patent No.: US 11,950,298 B2  
(45) Date of Patent: Apr. 2, 2024

(54) COMMUNICATION PROCESSING SYSTEM FOR WORKING MACHINE AND COMMUNICATION PROCESSING METHOD FOR WORKING MACHINE

(71) Applicant: KUBOTA CORPORATION, Osaka (JP)

(72) Inventors: Keisuke Miura, Osaka (JP); Keisuke Egashira, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 474 days.

(21) Appl. No.: 17/205,180

(22) Filed: Mar. 18, 2021

(65) Prior Publication Data

US 2021/0204335 A1 Jul. 1, 2021

Related U.S. Application Data

(63) Continuation of application No. 16/002,345, filed on Jun. 7, 2018, now Pat. No. 10,986,674.

(30) Foreign Application Priority Data

Jun. 7, 2017 (JP) ................................. 2017-112791  
Jun. 7, 2017 (JP) ................................. 2017-112792  
Jun. 7, 2017 (JP) ................................. 2017-112793

(51) Int. Cl.  
*H04W 76/10* (2018.01)  
*G06F 13/00* (2006.01)  
(Continued)

(52) U.S. Cl.  
CPC ............. *H04W 76/10* (2018.02); *G06F 13/00* (2013.01); *H04W 4/80* (2018.02); *H04W 48/16* (2013.01); *H04W 76/30* (2018.02)

(58) Field of Classification Search  
CPC .............. G08B 13/2462; H04W 76/10; G06Q 10/0833; G07C 5/008  
See application file for complete search history.

(56) References Cited

U.S. PATENT DOCUMENTS 7,574,821 B2 * 8/2009 Furem .................... E02F 9/262  
172/3  
8,787,229 B2   7/2014 Sasao et al.  
(Continued)

FOREIGN PATENT DOCUMENTS

JP  2004-247837 A  9/2004  
JP  2009-159325 A  7/2009  
(Continued)

*Primary Examiner* — Yee F Lam  
(74) *Attorney, Agent, or Firm* — Greenblum & Bernstein, P.L.C.

(57) ABSTRACT

A communication processing system for a working machine includes a communication device disposed on the working machine and configured to transmit a beacon containing machine information relating to the working machine, and a mobile terminal configured to receive the beacon, and to execute a connection processing for connecting with the communication device and an obtaining processing for obtaining the machine information, wherein the beacon includes a first beacon containing first activation information and a second beacon containing second activation information, and wherein the mobile terminal is configured, after executing the connection processing and the obtaining processing upon receiving the first beacon, not to execute the obtaining processing upon further receiving the first beacon, and to execute the same obtaining processing upon receiving the second beacon.

18 Claims, 8 Drawing Sheets

(51) Int. Cl.
*H04W 4/80* (2018.01)
*H04W 48/16* (2009.01)
*H04W 76/30* (2018.01)

(56) References Cited

U.S. PATENT DOCUMENTS

| | | |
|---|---|---|
| 2013/0128867 A1 | 5/2013 | Calcev et al. |
| 2013/0217331 A1* | 8/2013 | Manente ................ H04W 4/80 455/41.2 |
| 2013/0230035 A1 | 9/2013 | Grandhi et al. |
| 2014/0067152 A1* | 3/2014 | Swanson ................ H04W 4/46 701/1 |
| 2014/0133347 A1* | 5/2014 | Han ..................... H04W 48/12 370/253 |
| 2014/0200740 A1* | 7/2014 | Lavi ....................... H04W 4/80 701/2 |
| 2016/0284185 A1* | 9/2016 | Maison ................ H04B 5/0025 |
| 2016/0309288 A1 | 10/2016 | Helms et al. |
| 2017/0042089 A1* | 2/2017 | Bonefas ................ H04N 13/204 |
| 2017/0042090 A1* | 2/2017 | Bonefas ................ G05D 1/0246 |
| 2017/0064491 A1 | 3/2017 | Mirza et al. |
| 2017/0118573 A1* | 4/2017 | Yae ........................ H04W 4/48 |
| 2017/0132663 A1* | 5/2017 | High ..................... H04W 4/023 |
| 2017/0148231 A1* | 5/2017 | Cawse .................. G07C 5/008 |
| 2017/0311368 A1 | 10/2017 | Kandur Raja et al. |
| 2018/0099712 A1* | 4/2018 | Bean .................... H04L 12/2803 |
| 2018/0249310 A1 | 8/2018 | Kim et al. |
| 2018/0334138 A1* | 11/2018 | Namineni ............. G06F 1/3231 |
| 2019/0018990 A1 | 1/2019 | Alvarez Gonzalez |
| 2019/0121353 A1* | 4/2019 | Datema .................. B28C 7/022 |

FOREIGN PATENT DOCUMENTS

| | | |
|---|---|---|
| JP | 2013-239907 A | 11/2013 |
| JP | 2014-042508 A | 3/2014 |
| JP | 2014-71707 A | 4/2014 |
| JP | 2015-070462 A | 4/2015 |
| JP | 2015-192328 A | 11/2015 |
| WO | 2015-147034 A1 | 10/2015 |

\* cited by examiner

Fig.5

| Communication device | Mobile terminal External device |
|---|---|
| Activation info. F1 | Activation info. G1 |
| 5400 | 5411 |
| 5401 | 5412 |
| 5402 | 5413 |
| 5410 | — |
| 5411 | |
| 5412 | |
| 5413 | |

COMMUNICATION PROCESSING SYSTEM FOR WORKING MACHINE AND COMMUNICATION PROCESSING METHOD FOR WORKING MACHINE

CROSS-REFERENCE TO RELATED APPLICATIONS

The present application is a continuation application of U.S. patent application Ser. No. 16/002,345, which claims priority under 35 U.S.C. § 119 to Japanese Patent Application No. 2017-112791, filed Jun. 7, 2017, to Japanese Patent Application No. 2017-112792, filed Jun. 7, 2017, and to Japanese Patent Application No. 2017-112793, filed Jun. 7, 2017. The disclosure of each of the applications identified above is incorporated herein by reference in its entirety.

BACKGROUND OF THE INVENTION

Field of the Invention

The present invention relates to a communication processing system for a working machine and to a communication method for the working machine.

Discussion of the Background

A technique disclosed in Japanese Unexamined Patent Application Publication No. 2015-192328 is conventionally known as an access point device for a working machine, the access point device being configured to connect the working machine and a mobile terminal in wireless communication with each other. The access point device for the working machine of Japanese Unexamined Patent Application Publication No. 2015-192328 includes a storage part configured to store data of the working machine, an identifier setting part configured to set a data obtaining request stored in the storage part as a communication identifier that the mobile terminal can obtain, and a communicating part configured to transmit the communication identifier set by the identifier setting part to the outside and to transmit the data stored in the storage part to the mobile terminal.

A technique disclosed in Japanese Unexamined Patent Application Publication No. 2014-71707 is conventionally known as a technique for transmitting operating information or the like of a working machine to a mobile terminal. In Japanese Unexamined Patent Application Publication No. 2014-71707, in order for the mobile terminal to obtain the operation information, the mobile terminal firstly obtains the first permission key from a server (a first step), the mobile terminal transmits the obtained permission key to a communication device of the working machine (a second step), the validity of the permission key is judged by the communication device (a third step). When the validity of the permission key is authorized (a fourth step), the mobile terminal is connected to the communication device (a fifth Step), and after a predetermined processing (a sixth step), the mobile terminal can obtain the operation information transmitted from the communication device (a seventh step).

A technique disclosed in Japanese Unexamined Patent Application Publication No. 2015-192328 is conventionally known as an access point device for a working machine, the access point device being configured to connect the working machine and a mobile terminal in wireless communication with each other. The access point device for the working machine of Japanese Unexamined Patent Application Publication No. 2015-192328 includes a storage part configured to store data of the working machine, an identifier setting part configured to set a data obtaining request stored in the storage part as a communication identifier that the mobile terminal can obtain, and a communicating part configured to transmit the communication identifier set by the identifier setting part to the outside and to transmit the data stored in the storage part to the mobile terminal.

SUMMARY OF THE INVENTION

A communication processing system for a working machine includes a communication device disposed on the working machine and configured to transmit a beacon containing machine information relating to the working machine, and a mobile terminal configured to receive the beacon, and to execute a connection processing for connecting with the communication device and an obtaining processing for obtaining the machine information, wherein the beacon includes a first beacon containing first activation information and a second beacon containing second activation information, and wherein the mobile terminal is configured, after executing the connection processing and the obtaining processing upon receiving the first beacon, not to execute the obtaining processing upon further receiving the first beacon, and to execute the same obtaining processing upon receiving the second beacon.

A communication processing method for a working machine includes transmitting a beacon containing machine information relating to the working machine, from a communication device disposed on the working machine, and receiving the beacon to execute a connection processing for connecting with the communication device and an obtaining processing for obtaining the machine information, by a mobile terminal, wherein the beacon includes a first beacon containing first activation information and a second beacon containing second activation information, and wherein the mobile terminal is configured, after executing the connection processing and the obtaining processing upon receiving the first beacon, not to execute the obtaining processing upon further receiving the first beacon, and to execute the same obtaining processing upon receiving the second beacon.

In the communication processing system and the communication processing method, the mobile terminal is configured, after executing the connection processing and the obtaining processing upon receiving the first beacon, not to execute the obtaining processing upon further receiving the first beacon before completing the obtaining processing and transmitting a disconnection request to be disconnected from the communication device thereto, and to execute the same obtaining processing upon receiving the second beacon.

In the communication processing system and the communication processing method, the communication device is configured to transmit the second beacon when a data size of the machine information updated after the first beacon is transmitted is equal to or greater than the predetermined value.

The connection processing includes instructing to transmit a connection request to the mobile terminal such that the mobile terminal is connected with the communication device.

The obtaining processing includes activating an application software for the mobile terminal to obtain the machine information contained in the beacon.

In the communication processing system and the communication processing method, the working machine comprises a controller, a device to be controlled by the controller, a sensor to detect an operation condition of the device, a timer to obtain an operation time of the device, and wherein the machine information contains the operation condition and the operation time of the device.

In the communication processing system and the communication processing method, the working machine is one selected from a group consisting of a backhoe, a tractor, a combine, and a transplanter, a compact track loader and a skid steer loader.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a view illustrating a relation between activation information F1 and activation information G1 according to the embodiment;

DESCRIPTION OF THE EMBODIMENTS

Figure 1:
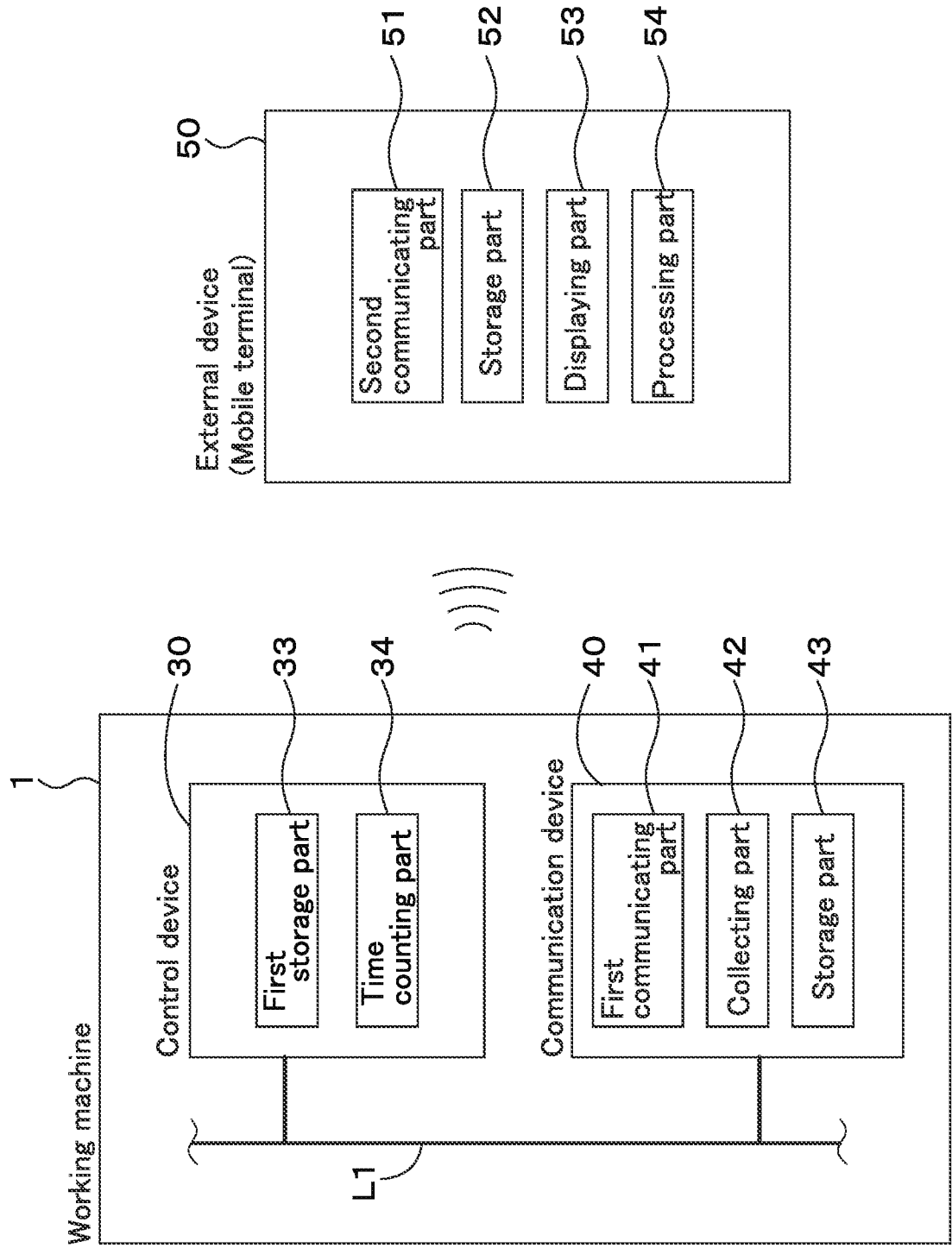
FIG. 1 is a schematic diagram of a data communication system for a working machine according to an embodiment of the present invention.

The embodiments of the present invention will now be described with reference to the accompanying drawings, wherein like reference numerals designate corresponding or identical elements throughout the various drawings. The drawings are to be viewed in an orientation in which the reference numerals are viewed correctly.

Figure 8:
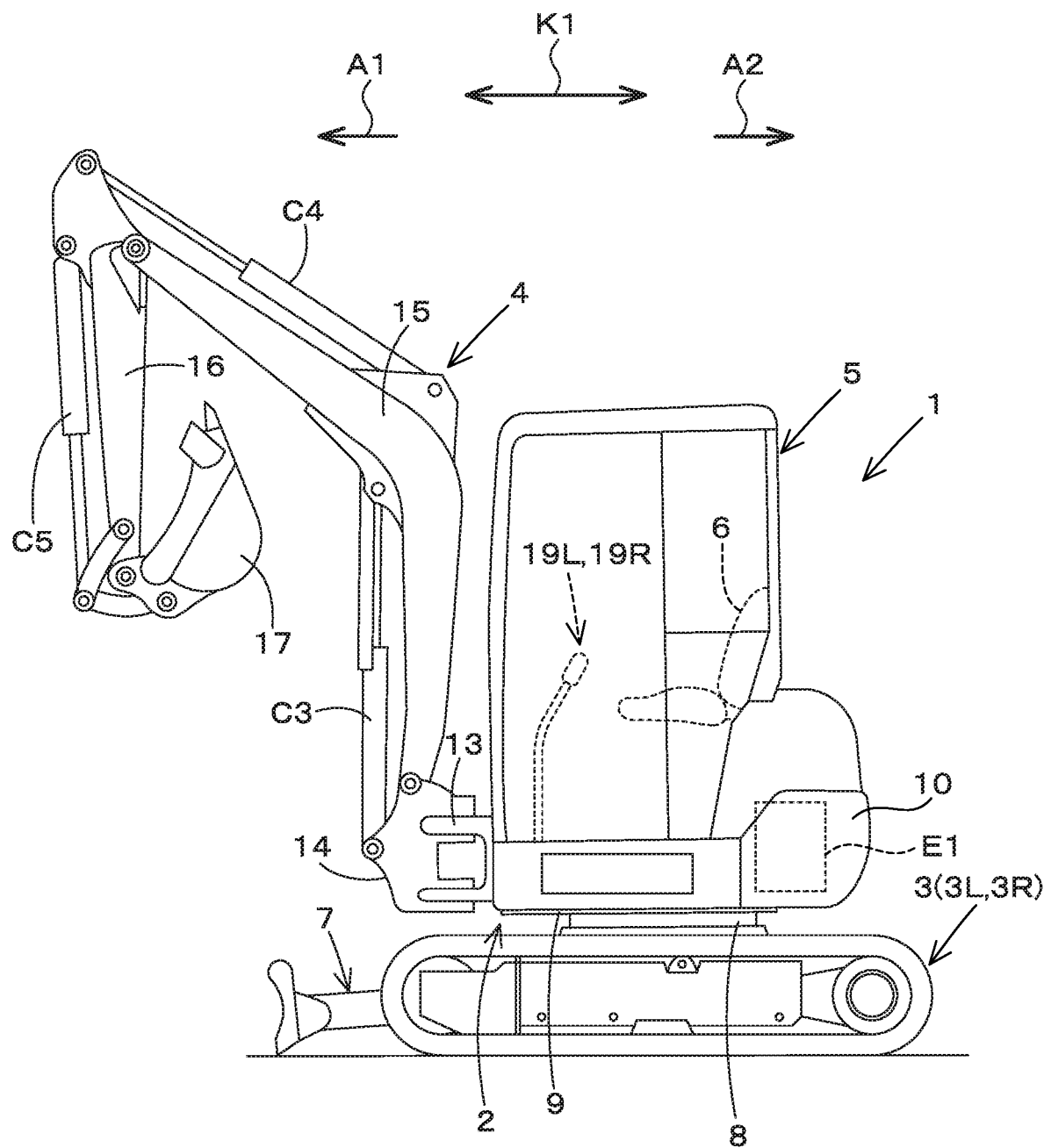
FIG. 8 is a schematic view illustrating a side surface of the working machine according to the embodiment.

FIG. 8 is a schematic side view showing an overall configuration of a working machine 1 according to an embodiment of the present embodiment. In the present embodiment, a backhoe that is a swiveling working machine is exemplified as the working machine 1. In the embodiment, the backhoe is exemplified as the working machine 1. However, the working machine may be an agricultural machine such as a tractor, a combine, and a rice transplanter, a compact track loader, a skid steer loader, or the like.

First, the overall configuration of the working machine 1 will be described

As shown in FIG. 8, the working machine 1 includes a machine body 2, a traveling device 3, and a working device 4. A cabin 5 is mounted on the machine body 2. An operator seat 6 is provided in the interior of the cabin 5.

In the explanation of the embodiment, the front side (the direction of the arrowed line A1 in FIG. 8) of the driver (an operator) seated on the operator seat 6 of the working machine 1 is referred to as the front, the rear side (the direction of the arrowed line A2 in FIG. 8) of the driver is referred to as the rear, the left side (the front surface side of FIG. 8) of the driver is referred to as the left, and the right side (the back surface side of FIG. 8) of the driver is referred to the right.

In addition, the horizontal direction which is a direction orthogonal to the front-to-back direction K1 will be described as a machine width direction. The direction from the center portion in a width direction of the machine body 2 toward the right portion or the left portion will be described as a machine outward direction.

In other words, the machine outward direction means a direction separating away from the center in the width direction of the machine body 2, that is, in the machine width direction. A direction opposite to the machine outward direction is referred to as a machine inward direction in the explanation. In other words, the machine inward direction is a direction approaching the center in the width direction of the machine body 2, that is, in the machine width direction.

As shown in FIG. 8, the traveling device 3 has a traveling body 3L provided on the left side and a traveling body 3R provided on the right side. The traveling body 3L and the traveling body 3R are crawler type traveling devices. A dozer device 7 is attached to the front portion of the traveling device 3. The dozer device 7 is configured to move upward and downward (raise and lower a blade) by stretching and shortening the dozer cylinder.

The machine body 2 is a swiveling base (a turning base), and is supported on a traveling device 3 by a pivot bearing 8 so as to freely turn about a longitudinal axis (an axis extending in the vertical direction). The machine body 2 is pivotally driven by a turning motor constituted of a hydraulic motor (the hydraulic actuator). The machine body 2 has a swiveling base plate 9 and a weight 10, the swiveling base plate 9 being configured to turn around the longitudinal axis. The swiveling base plate 9 is formed of a steel plate or the like, and is connected to the pivot bearing 8.

The weight 10 is provided at the rear portion of the machine body 2. A prime mover E1 is mounted on the rear portion of the machine body 2. The prime mover E1 is a diesel engine. The prime mover E1 may be an electric motor or a hybrid type having a diesel engine and an electric motor.

The machine body 2 has a supporting bracket 13 at the front portion slightly rightward from the center in the machine width direction. A swing bracket 14 is attached to the supporting bracket 13 so as to be swingable about the longitudinal axis. A working device 4 is attached to the swing bracket 14.

As shown in FIG. 8, the working device 4 has a boom 15, an arm 16, and a bucket (a working tool) 17. The base portion of the boom 15 is pivotally attached to the swing bracket 14 so as to be rotatable about a horizontal axis (an axis extending in the machine width direction).

In this manner, the boom 15 is freely swingable upward and downward in the vertical direction. The arm 16 is pivotally attached to the tip end side of the boom 15 so as to be rotatable about the horizontal axis. In this manner, the arm 16 is configured to freely swing back and forth or up and down.

The bucket 17 is provided on the tip end side of the arm 16, and configured to perform a shoveling operation and a dumping operation. Instead of or in addition to the bucket 17, it is possible for the working machine 1 to mount another working tool (an auxiliary attachment) configured to be driven by the hydraulic actuator. As other working tools (the auxiliary attachments), a hydraulic breaker, a hydraulic crusher, an angle bloom, an earth auger, a pallet fork, a sweeper, a mower, and a snow blower are exemplified.

The swing bracket 14 is configured to be swung freely by the stretching and the shortening of the swing cylinder provided inside the machine body 2. The boom 15 is configured to be swung freely by the stretching and the shortening of the boom cylinder C3. The arm 16 is configured to be swung by the stretching and the shortening of the arm cylinder C4.

The bucket 17 is configured to freely perform the shoveling operation and the dumping operation by the stretching and the shortening of the bucket cylinder (the working tool cylinder) C5. Each of the dozer cylinder, the swing cylinder, the boom cylinder C3, the arm cylinder C4, and the bucket cylinder C5 is constituted of the hydraulic cylinder (the hydraulic actuator).

A operation device 19L is provided on the left side of the operator seat 6 in the cabin 5, and a operation device 19R is provided on the right side of the operator seat 6.

FIG. 1 shows a schematic diagram of a data communication system for a working machine. With reference to FIG. 1, the devices and the data communication system mounted on the working machine 1 will be described.

As shown in FIG. 1, the working machine 1 has a control device 30. The control device 30 is a device configured to perform the controls relating to the working machine 1, and performs various types of controls such as the hydraulic pressure control, the auto idle control (the AI control), the boom height control, the arm height control, and the like.

Various types of sensors are connected to the control device 30, and values (the signals) detected by the sensors are inputted to the control device 30. For example, to the control device 30, an operation amount of the operation devices (the operation device 19L and the operation device 19R) detected by a position sensor or the like, a governor angle (a governor position) detected by a governor sensor, an operation amount (an operation extent) of an accelerator detected by a position sensor or the like, an engine revolutions speed detected by the rotation sensor or the like, an angle of the arm detected by an angle sensor or the like, and the angle of the boom detected by an angle sensor or the like are inputted.

In the hydraulic control, the control device 30 outputs a control signal to the proportional solenoid valve or the like in accordance with the operation amount of the operation devices 19L and 19R, sets the opening aperture of the proportional solenoid valve, and thereby controls a flow rate control valve connected to the proportional solenoid valve. That is, the hydraulic control controls the flow rate control valve configured to control the hydraulic actuators (the swing cylinder, the boom cylinder C3, the arm cylinder C4, and the bucket cylinder) is controlled.

In the automatic idle control, when the operation devices 19L and 19R are operated, the control device 30 outputs, to the engine, a control signal corresponding to the operation amount of the accelerator, thereby increasing or decreasing the engine revolutions speed, and when the operation devices 19L and 19R are not operated, the control device 30 outputs, to the engine, a control signal indicating the idling revolutions speed, thereby keeping the engine revolutions speed at the idling state.

In the boom height control, when the height of the boom 15 reaches the upper limit value of the preset boom height in the boom height control, the control device 30 stops the raising movement of the boom 15 irrespective of the operation of the operation devices 19L and 19R.

That is, in the boom height control, when the boom angle of the boom 15 in the raising movement reaches the upper limit value, the control device controls the flow rate control valve corresponding to the boom cylinder C3, thereby stopping the raising movement of the boom 15.

In the angle control of the arm, when the arm angle reaches the upper limit value or the lower limit value of a preset angle of the arm (an arm angle), the control device 30 stops the shoveling movement of the arm 16 irrespective to the operations of the operation devices 19L and 19R.

That is, in the arm angle control, when the arm angle of the arm 16 in the shoveling movement reaches the upper limit value or the lower limit value, the flow rate control valve corresponding to the arm cylinder C4 is operated, and thereby the shoveling movement of the arm 16 is stopped.

As described above, the control device 30 is configured to control various controls such as the hydraulic control, the auto idle control (the AI control), the boom height control, the arm height control, and the like. Meanwhile, the controls described above is merely an example and is not limited to the controls mentioned above, and the control device 30 executes necessary control according to the modes of the working machine 1.

The control device 30 includes a first storage part 33 and a time counting part 34. The time counting part 34 is constituted of electric/electronic parts provided in the control device 30, programs stored in the control device 30, and the like. The time counting part 34 calculates the operating time from the point of time when the engine revolutions speed detected by the engine revolutions speed starts to be inputted to the control device 30 (the start of driving) to the point of time when the inputting of the engine revolutions speed to the control device 30 ends (the end of driving).

In other words, the time counting part 34 obtains, by a timer or the like, the time (the elapsed time) during which the engine is driven. For example, in the case where the engine is driven continuously from 9 o'clock to 12 o'clock, the operation time (the elapsed time) is 3 hours. The time counting part 34 obtains an accumulated operation time (the hour meter) by accumulating the calculated operation time every time when the engine is driven (from the start of driving the engine to the end of driving the engine).

In the embodiment, the accumulated value of the operating time from the start of driving the engine to the end of the driving is set as the accumulated operating time. However, the time during which the driving parts other than the engine is driven may be set as the accumulated operating time (the hour meter), and the accumulated operating time is not limited to that of the engine. The first storage part 33 is constituted of a nonvolatile memory or the like, and stores the accumulated operation time counted by the time counting part 34.

As shown in FIG. 1, the working machine 1 has a communication device 40. The communication device 40 is a device configured to output data (information) of the working machine 1 to the outside of the working machine 1 and to take the external data into the working machine 1. The communication device 40 has a first communicating part 41. The first communicating part 41 is configured to be connected to an outside device (an external device) 50.

The first communicating part 41 is configured to output a broadcast signal such as a beacon to the external device 50, and for example, to perform the wireless communication with the external device 50 in the Bluetooth Low Energy (a registered trademark) and the like in the specification of Bluetooth (a registered trademark) of the communication standard IEEE 802.15.1 series.

The communication device 40 includes a collecting part 42 and a storage part 43. The collecting part 42 is constituted of electric/electronic parts provided in the communication device 40, programs stored in the communication device 40, and the like. The collecting part 42 is configured to collect the machine information on the working machine.

In particular, the communication device 40, the control device 30 provided in the working machine 1, and the device such as a sensor are connected by a communication line L1 or the like, and the collecting part 42 obtains various signals (the data) flowing in the communication line L as the machine information.

In particular, the collecting part 42 collects, as the machine information, the signals from the various sensors, the accumulated operation time, and the like obtained under the state where the control device 30 executes the control such as the auto idle control, the boom height control, the arm height control, and the like.

In the embodiment described above, the signal and the accumulated operation information obtained in the case where the control device 30 executes the controls are the machine information. However, the machine information collected by the collecting part 42 is not limited to those mentioned above. The collecting part 42 may collect information, as the machine information, relating to malfunction and warning of the devices mounted on the working machine 1, or may collect the set values and the like, as the machine information, of the devices of the working machine 1. Any information on the working machine 1 may be collected as the machine information.

The storage part 43 is constituted of a nonvolatile memory or the like, and temporarily stores the machine information collected by the collecting part 42. The machine information temporarily stored in the storage part 43, that is, the machine information collected by the collecting part 42 is transmitted to the external device 50 by the communication device 40 (the first communicating part 41).

The external device 50 is a tablet, a smartphone, a PDA or the like, that is, a mobile terminal that can be carried around. The mobile terminal 50 is configured to be connected to the communication device 40 provided in the working machine 1, and is capable of transmitting and receiving various data (information) to and from the communication device 40. The mobile terminal 50 has a second communicating part 51.

The second communicating part 51 is constituted of components or the like for performing the short-range communication and the long-range communication, and is, for example, configured to perform the wireless communication with the communication device 40 in the Bluetooth Low Energy (a registered trademark) and the like in the specification of Bluetooth (a registered trademark) of the communication standard IEEE 802.15.1 series. Meanwhile, it should be noted that the second communicating part may be configured to perform the wireless communication by a mobile phone communication network, a data communication network, a cellular phone communication network, or the like.

The mobile terminal 50 includes a storage part 52, a display part 53, and a processing part 54. The storage part 52 is constituted of a nonvolatile memory, and stores the machine information received from the communication device 40, various application software (the applications), an operation system (an OS), and the like. The display part 53 is configured to display various information, and is constituted of a liquid crystal panel or the like. The processing part 54 is constituted of electric/electronic parts provided in the mobile terminal 50, programs (the applications, the OS) stored in the mobile terminal 50, and the like. The processing part 54 executes the various processing of the mobile terminal 50.

Next, the connection between the mobile terminal 50 and the communication device 40 will be described.

Figure 2:
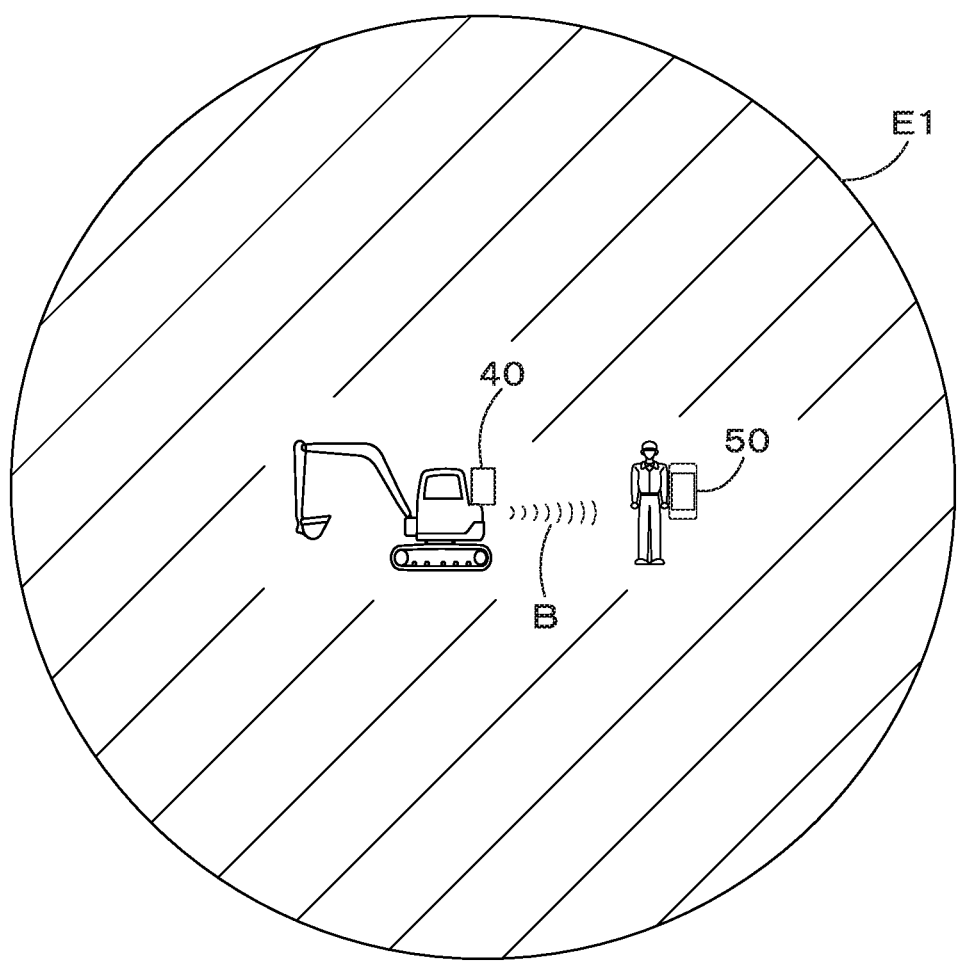
FIG. 2 is an explanation view explaining connection between a mobile terminal and a communication device according to the embodiment.

As shown in FIG. 2, the first communicating part 41 of the communication device 40 outputs the beacon B. In the case where the mobile terminal 50 (the second communicating part 51) is located outside the communication area E1 of the beacon B (the area where the beacon B can be transmitted), the processing part 54 does not execute the obtaining processing for obtaining the machine information.

The obtaining processing is a process of obtaining the machine information of the work machine 1, of reading, from the storage part 52, the application software (referred to as an obtaining application) for storing the machine information in the mobile terminal 50, and then of activating the application software, the processing part 54 does not execute the activation of the obtaining application when the mobile terminal 50 is positioned outside the communication area E1.

Meanwhile, it is to be noted that the obtaining application is an application for executing the processing for obtaining the machine information, and thus the mobile terminal 50 stores a program to be installed to the mobile terminal 50 to execute the obtaining processing, information (Service UUID, PIN code, and the like) necessary for the connection between the mobile terminal 50 and the communication device 40, and the activation information G1 mentioned below, and the like.

In the case where the mobile terminal 50 is within the communication area E1, the processing part 54 executes the start of the obtaining processing for obtaining the machine information at the point when the second communicating part 51 of the mobile terminal 50 receives the beacon B, and activates the obtaining application. The processing part 54 executes the connection processing after activating the obtaining application (after the start of the obtaining processing).

In the connection processing, at least the processing part 54 instructs the second communicating part 51 to connect with the communication device 40. In response to the instruction from the processing part 54, the second communicating part 51 transmits a connection request to the communication device 40, and the communication between the communication device 40 and the second communicating part 51 is performed. When the communication is established between the communication device 40 and the second communicating part 51, the processing part 54 causes the operation (processing) of the obtaining application or the like to obtain the machine information transmitted from the communication device 40.

When the obtaining of the machine information is completed, the processing part 54, for example, terminates the connection process at the timing when the second communicating part 51 receives a signal indicating that the machine information to be transmitted from the communication device 40 has been transmitted, and disconnects the communication between the second communicating part 51 and the communication device 40. After disconnection of the communication with the second communicating part 51, the communication device 40 outputs the beacon B again.

Figure 3:
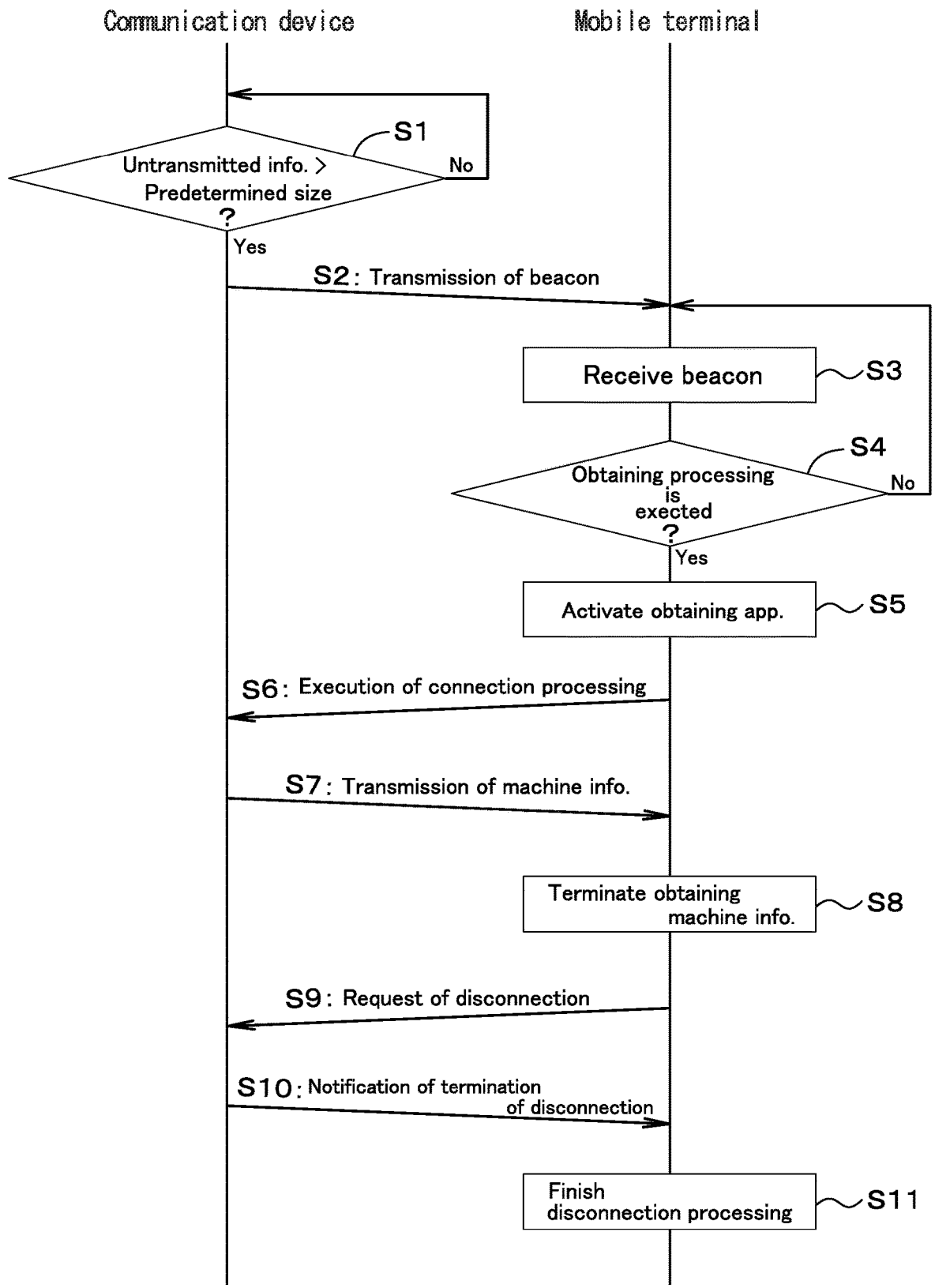
FIG. 3 is a view illustrating a flowchart of the connection between the mobile terminal and the communication device according to the embodiment.

FIG. 3 shows a flowchart of the connection between the mobile terminal 50 and the communication device 40. With reference to FIG. 3, the connection between the mobile terminal 50 and the communication device 40 will be described in detail.

As shown in FIG. 3, among all of the machine information stored in the storage part 43 (all the machine information), the communication device 40 judges whether the data size of the machine information that has not been transmitted to the mobile terminal 50 (the untransmitted information) is equal to or greater than a predetermined value (S1).

In the case where the data size of the untransmitted information is equal to or larger than the predetermined size (S1, Yes), the first communicating part 41 of the communication device 40 transmits the beacon B to request the mobile terminal 50 to obtain the machine information (S2: a transmission step).

When the second communicating part 51 of the mobile terminal 50 receives the beacon B (S3), the processing part 54 judges whether to execute the obtaining processing on the basis of the information included in the beacon B (S4).

Figure 4:
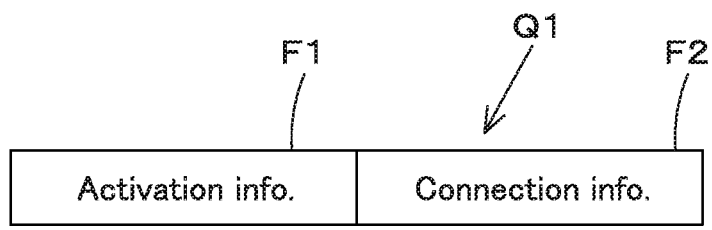
FIG. 4 is a view illustrating one example of a packet of a beacon according to the embodiment.

FIG. 4 shows a packet (an advertisement packet) Q1 of beacon B. As shown in FIG. 4, the packet Q1 includes the activation information F1 and the connection information F2. The activation information F1 is information serving as a trigger of the start of obtaining processing.

In the case where the activation information F1 included in the beacon B (the packet Q1) transmitted by the communication device 40 and the activation information G1 identical to the activation information F1 are stored in the storage part 52 of the mobile terminal 50, the processing part 54 determines to execute the obtaining processing (S4, Yes).

On the other hand, in the case where the activation information F1 included in the beacon B (the packet Q1) transmitted by the communication device 40 and the activation information G1 identical to the activation information F1 are not stored in the storage part 52 of the mobile terminal 50, the processing part 54 determines not to execute the obtaining processing (S4, No).

FIG. 5 shows the relation between the activation information F1 of the beacon B transmitted by the communication device 40 and the activation information G1 stored in the storage part 52 of the mobile terminal 50. As shown in FIG. 5, in the case where the activation information F1 transmitted by the communication device 40 is a numeral "5411" and the activation information G1 stored in the storage part 52 of the mobile terminal 50 is a numeral "5411", both of the activation information are identical to each other, and thus the processing part 54 determines to execute the obtaining processing.

On the other hand, in the case where the activation information F1 transmitted by the communication device 40 is a numeral "5400" and the numeral "5400" is not stored in the activation information G1 stored in the storage part 52 of the mobile terminal 50, both of the activation information are not identical to each other, and thus the processing part 54 determines not to execute the obtaining processing.

Meanwhile, in the embodiment described above, the obtaining processing is executed in the case where the activation information G1 identical to the activation information F1 of the beacon B is stored in the mobile terminal 50. However, instead of that, the processing part 54 may execute the obtaining processing in the case where the mobile terminal 50 stores the activation information G1 associated with the activation information F1 of the beacon B.

When the processing part 54 determines to execute the obtaining processing (Yes, S4), the processing part 54 executes the start of the obtaining processing and activates the obtaining application (S5: an obtaining execution step).

Upon completion of activation of the obtaining application, the processing part 54 executes connection processing (S6: connection execution step).

For example, after the execution of the connection processing, the processing part 54 performs the connection processing to the communication device 40 using the connection information F2 received. The connection information F2 is information for connecting with the communication device 40, that is, the service UUID, the PIN code, and the like, for example. And, the second communicating part 51 transmits the service UUID or the PIN code to the communication device 40, and thereby the connection between the mobile terminal 50 and the communication device 40 is established.

The process relating to the connection between the mobile terminal 50 and the communication device 40 is the same as the conventional process, and executes the authentication of the service UUID or the PIN code.

After connecting to the mobile terminal 50 (the second communicating part 51), the communication device 40 transmits the machine information stored in the storage part 43 (the untransmitted machine information) to the mobile terminal 50 (S7).

The communication device 40 notifies the mobile terminal 50 that the transmission of the machine information is completed. When the processing part 54 receives that the transmission of the machine information is completed, the processing part 54 determines that the obtaining of the machine information is completed (S8), and requests the disconnection to the communication device 40 (S9).

In response to the disconnection request from the mobile terminal 50, the communication device 40 executes the disconnection of the communication with the mobile terminal 50, and transmits a notification of the completion of the disconnection to the mobile terminal 50 (S10).

When the mobile terminal 50 receives the completion of the disconnection, the processing part 54 terminates the connection processing (S11: a connection terminating step).

After the communication with the mobile terminal 50 is disconnected, the communication device 40 returns to the process of outputting the beacon B, and continuously outputs the beacon B repeatedly every time when the connection terminating step is completed. In addition, the mobile terminal 50 stores the machine information received from the communication device 40 in the storage part 52.

The machine information stored in the storage part 52 of the mobile terminal 50 can be displayed on the display part 53 and can be transmitted to an external device other than the mobile terminal 50, for example, to a server, a personal computer, or the like.

According to the above description, the data communication system for the working machine including the communication device 40 and the mobile terminal 50 configured to execute the connection processing and the obtaining processing, the communication device 40 transmits the beacon B including the activation information F1 requesting the mobile terminal 50A to start the obtaining processing and the connection information F2 requesting the execution of the connection processing.

In addition, the mobile terminal 50 starts the obtaining processing when obtaining the activation information F1 and executes the connection process after the starting of the obtaining processing, and thereby the mobile terminal 50 obtains the machine information from the communication device 40.

In this manner, the mobile terminal 50 can execute the obtaining processing and the connection process only by receiving the beacon B transmitted from the communication device 40, and the mobile terminal 50 automatically obtains the machine information of the working machine 1 upon reception of the reception of the beacon B serving as the trigger.

In addition, only when the operator who owns the working machine or the operator who operates the working machine carries the mobile terminal 50, the mobile terminal 50 automatically obtains the machine information of the working machine 1 without operations by the operator.

In addition, the processing part 54 terminates the connection processing when the obtaining of the machine information is completed. Thus, since the connection process is terminated when the mobile terminal 50 obtains the machine information, it is possible to prevent the mobile terminal 50 and the communication device 40 from being connected unlimitedly to each other, and the communication device 40 is capable of newly transmitting the beacon B to the other mobile terminal 50.

For example, in the case where the first mobile terminal owned by the operator A, the second mobile terminal owned by the operator B and further the first mobile terminal and the second mobile terminal are present in the communication area E1, the connection processing is terminated immediately after the first mobile terminal obtains the machine information from the communication device 40, and thus the second mobile terminal can obtain the machine information from the communication device 40.

In addition, the communication device 40 continuously transmits the beacon including the activation information F1 and the connection information F2 repeatedly. Thus, after disconnection of the communication with a predetermined one of the mobile terminals 50, the control device 40 can immediately make a connection with another one of the mobile terminals 50, and thus can transmit the machine information to the another one of the mobile terminals 50.

Meanwhile, the communication device 40 is configured to transmit a plurality of beacons. For example, the communication device 40 is configured to transmit separately, at different timings, the first beacon B1 and the second beacon B2 including the second activation information.

The first beacon B1 and the second beacon are beacons each including different information. The first beacon B1 includes the first activation information, and the second beacon B2 includes the second activation information.

Figure 6:
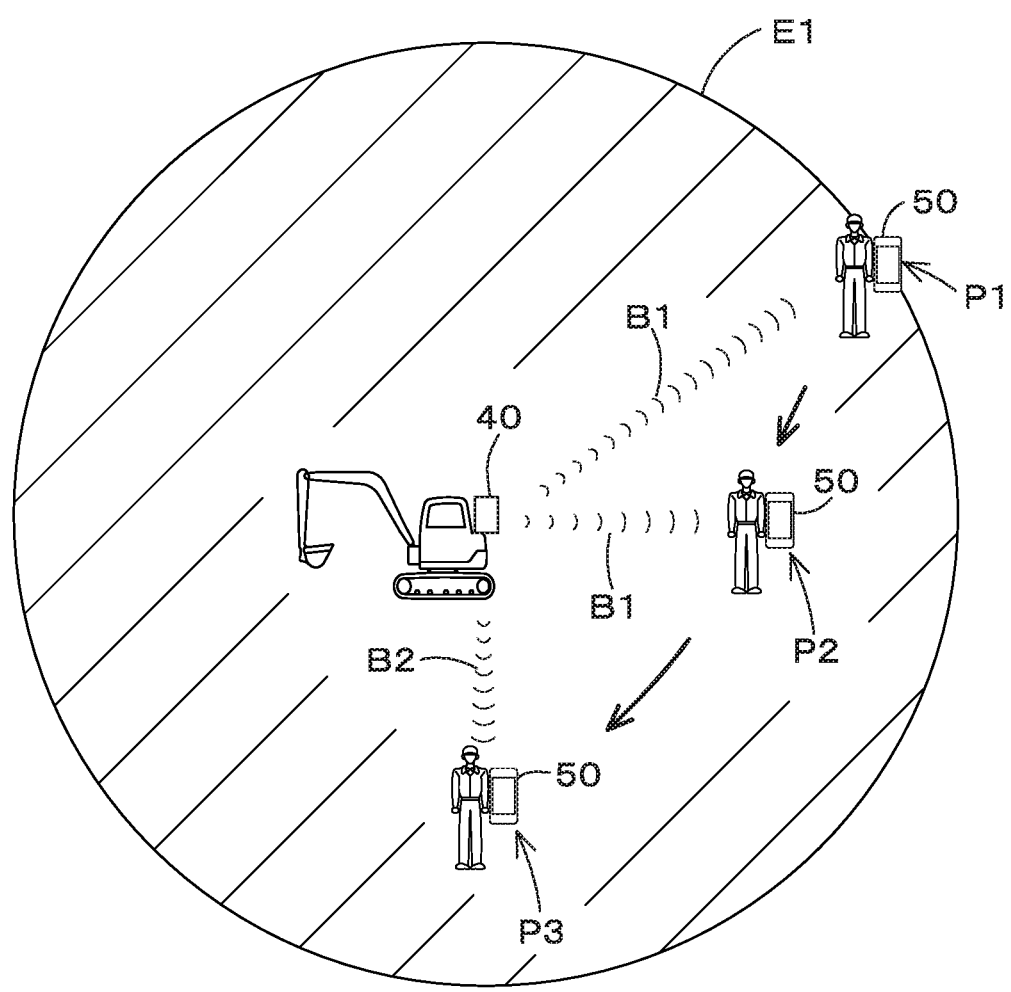
FIG. 6 is a view illustrating a state where a communication device transmits a first beacon B1 and a second beacon B2 according to the embodiment.

FIG. 6 shows a state in which the communication device 40 transmits the first beacon B1 and the second beacon B2 to a predetermined one of the mobile terminals 50. For example, the connection between the communication device 40 and the mobile terminal 50 will be described on the assumption that the first activation information is a numeral "5411" and the second activation information is a numeral "5412".

As shown in FIG. 6, in the case where the mobile terminal 50 receives the first beacon B1 at the position P1 that is a boundary of the communication area E1, the first beacon B1 including the first activation information, the mobile terminal 50 stores the activation information identical to the first activation information as shown in FIG. 5, and thus the processing part 54 of the mobile terminal 50 executes the obtaining processing and the connection processing.

After that, in the case where the mobile terminal 50 receives the first beacon B1 same as the beacon received at the position P1 at the position P2 in the communication area E1, the first beacon B1 being same as the beacon received at the position P1, that is, in the case where the mobile terminal 50 receives the first beacon B1 at the position P2 different from the position P1, the first beacon B1 including the activation information same as the activation information that serves as a trigger of starting the obtaining processing at the position P1, the processing part 54 does not execute the obtaining processing.

In addition, in the case where the mobile terminal 50 receives the second beacon B2 different from the first beacon B1 at the position P3 within the communication area E1, the processing part 54 starts the processing same as the processing executed on the first beacon B1, that is, the obtaining processing, and thereby activates the obtaining application, taking the reception of the second beacon B2 as a trigger. Then, the mobile terminal 50 obtains the machine information from the communication device 40 by performing the connection processing after the start of the obtaining processing.

That is, in the case where the obtaining processing is executed in the communication area E1, taking with the reception of the first beacon B1 as a trigger, the mobile terminal 50 executes the obtaining processing when receiving the second beacon B2 different from the first beacon B1 without executing the obtaining processing even when receiving the same first beacon B1 after that.

Note that, in the case where the obtaining processing is executed taking with the reception of the second beacon B2 as a trigger, the mobile terminal 50 does not execute the obtaining processing even when the second beacon B2 identical to the second beacon B2 mentioned above is received thereafter, and the mobile terminal 50 executes the obtaining processing when receiving a beacon different from the first beacon B1 and the second beacon B2.

According to the above description, when the mobile terminal 50 receives the beacon having the same activation information in a plurality of times under the state where the mobile terminal 50 is located within the communication area E1, the mobile terminal 50 does not execute the obtaining processing by the beacon transmitted at the second time and thereafter.

Meanwhile, in the case where the mobile terminal 50 receives the beacon (referred to as an old beacon) within the communication area E1, the mobile terminal 50 moves out of the communication area E1 and falls to being unable to receive the old beacon after executing the obtaining processing triggered by the reception of the old beacon, and then further the mobile terminal 50 reenters the communication area E1 again and receives the beacon identical to the old beacon, the obtaining processing may be executed at least once upon reception of the beacon identical to the old beacon as a trigger.

That is, in the case where the mobile terminal 50 moves out of the communication area E1 and falls into the state in which it is unable to receive the first beacon B1 or the second beacon B2 once, the mobile terminal 50 may perform the obtaining processing on the basis of the first beacon B1 or the second beacon B2.

Figure 7:
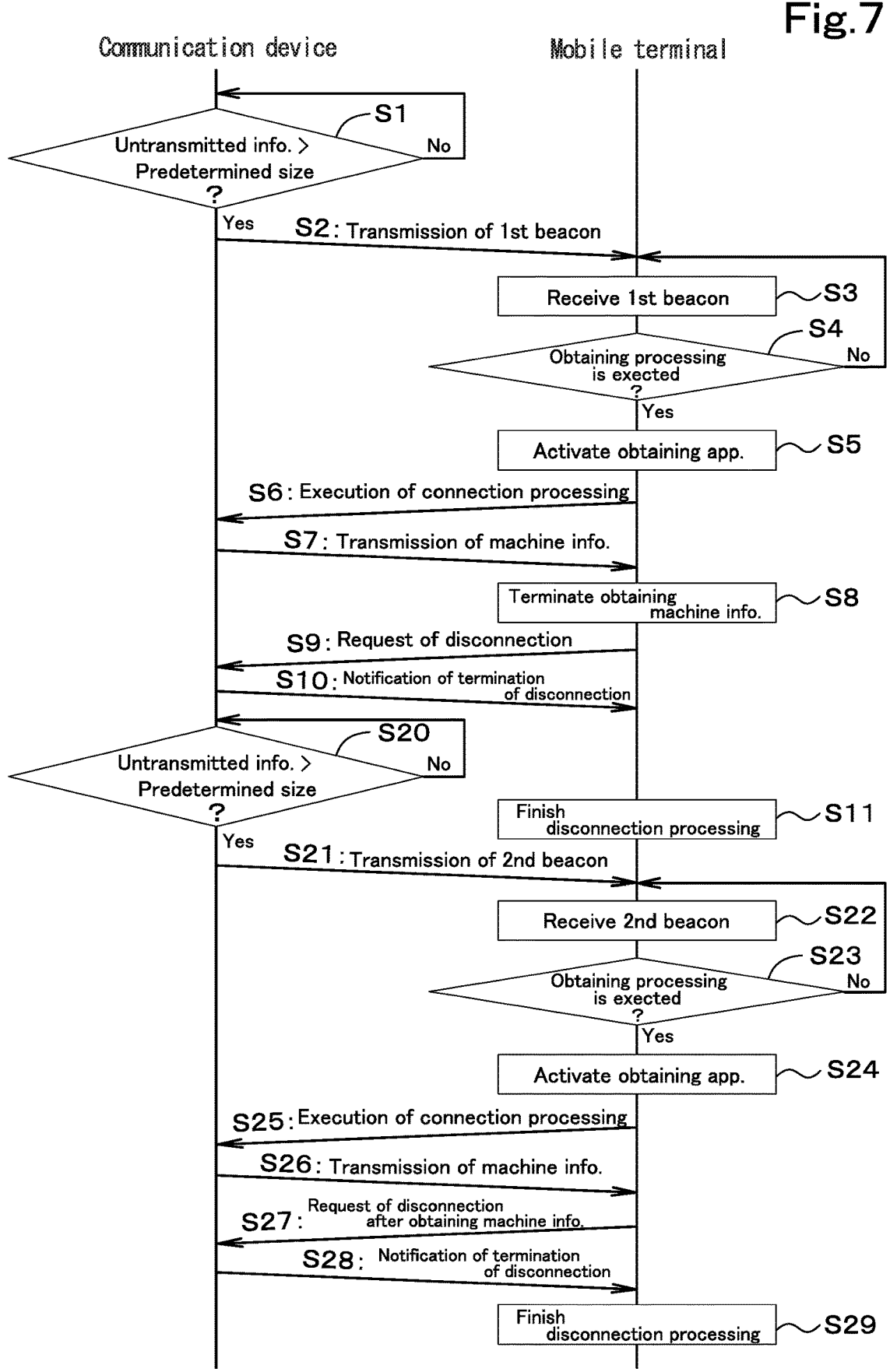
FIG. 7 is a view illustrating a flowchart of a case where the first beacon B1 and the second beacon B2 are transmitted to the mobile terminal according to the embodiment.

FIG. 7 shows a flowchart of the case where the communication device 40 transmits the first beacon B1 and the second beacon B2 to a predetermined one of the mobile terminals 50. In the explanation of FIG. 7, the description proceeds with the assumption that a predetermined one of the mobile terminals 50 does not move out of the communication area E1 after entering the communication area E1 once.

In FIG. 7, the steps S1 to S3 and the steps S5 to S11 are the same as those in FIG. 6 except the transmission of the beacon B1 by the communication device 40.

In the case where the data size of the unsent information is equal to or greater than a predetermined size and the communication device 40 requests the connection to the mobile terminal 50 (S1, Yes), the first communicating part 41 of the communication device 40 transmits the first beacon B1 (S2: a first transmission step).

When the second communicating part 51 of the mobile terminal 50 receives the first beacon B1 (S3), the processing part 54 judges whether or not to execute the obtaining processing on the basis of the information included in the first beacon B1 (S4).

When the activation information included in the first beacon B1 is stored in the storage part 52 of the mobile terminal 50 and the obtaining processing has never performed based on the first beacon B1, the processing part 54 determines to execute the obtaining processing (S4, Yes).

On the other hand, in the case where the activation information included in the first beacon B1 is not stored in the storage part 52 of the mobile terminal 50, or in the case where the obtaining processing has already performed based on the first beacon B1 even when the activation information included in the first beacon B1 is stored in the storage part 52, the processing part 54 determines not to execute the obtaining processing (S4, No).

After the processing at S4, the communication device 40 and the mobile terminal 50 execute steps S5 to S10 as described above.

After connecting to the mobile terminal 50 on the basis of the first beacon B1 (after S11), the communication device 40 judges whether or not the data size of unsent information is equal to or greater than a predetermined value (S20).

In the case where the data size of unsent information is equal to or greater than the predetermined value and the request for the connection is made to the mobile terminal 50 (S20, Yes: a second transmission step), the first communicating part 41 transmits the second beacon B2 (S21).

In other words, in the second transmission step, when the machine information stored in the storage part 43 is updated after the transmission of the first beacon B1 and the mobile terminal 50 is requested to obtain the updated machine information, the second beacon B1 is transmitted.

When the second communicating part 51 of the mobile terminal 50 receives the second beacon B2 (S22), the processing part 54 judges whether or not to execute the obtaining processing on the basis of the information included in the second beacon B2 (S23).

In the case where the activation information included in the second beacon B2 is stored in the storage part 52 of the mobile terminal 50 and the obtaining processing has been never performed on the basis of the second beacon B2, the processing part 54 determines to execute the obtaining processing (S23, Yes).

On the other hand, in the case where the activation information included in the second beacon B2 is not stored in the storage part 52 of the mobile terminal 50, or in the case where the obtaining processing has already been performed on the basis of the second beacon B2 even when the activation information included in the second beacon B2 is stored in the storage part 52, the processing part 54 determines not to execute the obtaining processing (S23, No).

When determining that the obtaining processing is to be executed (S23, Yes), the processing part 54 starts the obtaining processing and activates the obtaining application (S24).

That is, also in the case where the processing part 54 receives the second beacon B2, the processing part 54 executes the processing same as the processing based on the first beacon B1.

In other words, even when a plurality of application software programs are stored in the mobile terminal 50, the same application software is activated in the obtaining processing in both of the case of receiving the first beacon B1 and the case of receiving the first beacon B2.

Upon completion of the activation of the obtaining application, the processing part 54 executes the connection processing (S25: a connection execution step).

The communication device 40 transmits the machine information stored in the storage part 43 (S26).

After obtaining the machine information, the processing part 54 issues a disconnection request to the communication device 40 (S27).

The communication device 40 executes disconnection of the communication with the mobile terminal 50 and transmits, to the mobile terminal 50, a notification of completion of the disconnection (S28).

When the mobile terminal 50 receives the disconnection completion, the processing part 54 terminates the connection processing (S29: a connection terminating step).

According to the above, the communication device 40 (the first communicating part 41) is configured to transmit a plurality of the beacons, and the processing part 54 does not execute the processing when receiving a first beacon B1 of the plurality of beacons, the first beacon B1 including the information identical to the information serving as a trigger for executing the processing, and to execute the processing when obtaining the second beacon B2 different from the first beacon B1.

That is, in the case where the processing part 54 obtains the first beacon B1 including the activation information same as the activation information serving as the trigger for starting the processing out of the plurality of beacons, the processing part 54 does not execute the obtaining processing, and when obtaining the second beacon B2 having the activation information different from that of the first beacon B1, the processing part 54 executes the obtaining processing.

According to the configuration, the mobile terminal 50 can be caused to execute arbitrary processing triggered by the first beacon B1 and the second beacon B2 under the state where the mobile terminal 50 is located in the communication area E1.

For example, in the case where the process triggered by the first beacon B1 and the second beacon B2 is the obtaining processing, the mobile terminal 50 can automatically obtain the machine information separately at the different timings while staying in the communication area E1.

In addition, the mobile terminal 50 has a storage part 52 configured to store the first activation information and the second activation information, the first activation information being associated with the first beacon B1, the second activation information being associated with the second beacon B2. The processing part 54 executes the identical processing in both of the case where the processing part 54 obtains the first beacon B1 corresponding to the first activation information stored in the storage part 52 and the case where the processing part 54 obtains the second beacon B2 corresponding to the second activation information stored in the storage part 52.

In this manner, under the state where the mobile terminal 50 is located in the communication area E1, the mobile terminal 50 can execute the identical processing respectively triggered by first beacon B1 and the second beacon B2.

For example, in the case where an application software is installed in the mobile terminal 50, the application software can be activated at different timings depending on the first beacon B1 and the second beacon B2.

The first communicating part 41 transmits the second beacon B2 in the case of requesting the connection to the mobile terminal 50 after connecting to the mobile terminal 50 in accordance with the first beacon B1. under the state where the mobile terminal 50 is located in the communication area E1, the working machine 1 (the first communicating part 41) can connect to the mobile terminal 50 at different timings separately on the basis of the first beacon B1 and the second beacon B2.

In addition, the communication device 40 includes the collecting part 42 and the storage part 43. The first communicating part 41 transmits the first beacon B1 in the case where the first communicating part 41 requests the mobile terminal 50 to obtain the machine information stored in the storage part 43.

In this manner, it is possible to transmit the machine information of the working machine 1 to a predetermined one of the mobile terminals 50 in accordance with the first beacon B1. In the case where the second communicating part 51 obtains the second beacon B2, the second communicating part 51 connects to the communication device 50 that has transmitted the second beacon B2.

In addition, in the case where the machine information stored in the storage part is updated after the transmission of the first beacon B1 and the first communication part 41 requests the mobile terminal 50 to obtain the machine information updated, the first communicating part 41 transmits the second beacon B2.

In this manner, in the case where the machine information of the working machine 1 is updated after the machine information of the working machine 1 is transmitted to a predetermined one of the mobile terminals 50 in accordance with the first beacon B1, the machine information updated can be transmitted to the mobile terminal 50.

In the above description, the embodiment of the present invention has been explained. However, all the features of the embodiments disclosed in this application should be considered just as examples, and the embodiments do not restrict the present invention accordingly. A scope of the present invention is shown not in the above-described embodiments but in claims, and is intended to include all modifications within and equivalent to a scope of the claims.

In the embodiment described above, the system for collecting the machine information of the working machine 1 has been described. However, instead of the system, the embodiment may be applied to the system (an anti-theft system) for transmitting the authentication information from the external equipment 50 such as the mobile terminal to the working machine 1.

In the case where the beacon is received, the anti-theft system transmits the authentication information from the mobile terminal 50 to the working machine 1.

In addition, the working machine 1 side (the control device 30 side) executes the authentication process for authenticating between the authentication information stored in the control device 30 and the authentication information transmitted from the mobile terminal 50, and then permits the starting of the prime mover E1 after the establishment of authentication of the authentication information and does not permit the starting of the prime mover E1 when the authentication is not established.

In that case, the obtaining application is an application software for transmitting the authentication information stored in advance in the mobile terminal 50 when the mobile terminal 50 receives the beacon.

In addition, the obtaining application may be an application software integrating an application software that performs the processing relating to the anti-theft (the transmission of the authentication information) and an application software that collects the machine information of the working machine 1.

What is claimed is:

1. A communication processing system for a working machine, comprising:
    a communication device disposed on the working machine and configured to transmit a beacon containing machine information relating to the working machine; and
    a mobile terminal configured to receive the beacon, and to execute a connection processing for connecting with the communication device and an obtaining processing for obtaining the machine information,
    wherein the beacon includes a first beacon containing first activation information and a second beacon containing second activation information, and
    wherein the mobile terminal is configured, after executing the connection processing and the obtaining processing upon receiving the first beacon, not to execute the obtaining processing upon further receiving the first beacon before completing the obtaining processing and transmitting a disconnection request to be disconnected from the communication device thereto, and to execute the same obtaining processing upon receiving the second beacon.

2. The communication processing system according to claim 1,
    wherein the connection processing includes instructing to transmit a connection request to the mobile terminal such that the mobile terminal is connected with the communication device.

3. The communication processing system according to claim 1,
    wherein the obtaining processing includes activating an application software for the mobile terminal to obtain the machine information contained in the beacon.

4. The communication processing system according to claim 1,
    wherein the working machine comprises a controller, a device to be controlled by the controller, a sensor to detect an operation condition of the device, a timer to obtain an operation time of the device, and
    wherein the machine information contains the operation condition and the operation time of the device.

5. The communication processing system according to claim 1,
    wherein the working machine is one selected from a group consisting of a backhoe, a tractor, a combine, and a transplanter, a compact track loader and a skid steer loader.

6. A communication processing method for a working machine, comprising:
    transmitting, from a communication device disposed on the working machine, a beacon containing machine information relating to the working machine; and
    receiving, by a mobile terminal, the beacon to execute a connection processing for connecting the mobile terminal with the communication device and an obtaining processing for obtaining the machine information, wherein the beacon includes a first beacon containing first activation information and a second beacon containing second activation information, and wherein the mobile terminal is configured, after executing the connection processing and the obtaining processing upon receiving the first beacon, not to execute the obtaining processing upon further receiving the first beacon before completing the obtaining processing and transmitting a disconnection request to be disconnected from the communication device thereto, and to execute the same obtaining processing upon receiving the second beacon.

7. The communication processing method according to claim 6, comprising:
instructing to transmit a connection request from the communication device to the mobile terminal such that the mobile terminal is connected with the communication device.

8. The communication processing method according to claim 6, comprising:
activating an application software for the mobile terminal to obtain the machine information contained in the beacon.

9. The communication processing method according to claim 6,
wherein the working machine comprises a controller, a device to be controlled by the controller, a sensor to detect an operation condition of the device, a timer to obtain an operation time of the device, and
wherein the machine information contains the operation condition and the operation time of the device.

10. The communication processing method according to claim 6,
wherein the working machine is one selected from a group consisting of a backhoe, a tractor, a combine, and a transplanter, a compact track loader and a skid steer loader.

11. A communication processing system for a working machine, comprising:
a communication device disposed on the working machine and configured to transmit a beacon containing machine information relating to the working machine; and
a mobile terminal configured to receive the beacon, and to execute a connection processing for connecting with the communication device and an obtaining processing for obtaining the machine information,
wherein the beacon includes a first beacon containing first activation information and a second beacon containing second activation information,
wherein the mobile terminal is configured, after executing the connection processing and the obtaining processing upon receiving the first beacon, not to execute the obtaining processing upon further receiving the first beacon, and to execute the same obtaining processing upon receiving the second beacon, and
wherein the communication device is configured to transmit the second beacon when a data size of the machine information updated after the first beacon is transmitted is equal to or greater than a predetermined value.

12. The communication processing system according to claim 11,
wherein the connection processing includes instructing to transmit a connection request to the mobile terminal such that the mobile terminal is connected with the communication device.

13. The communication processing system according to claim 11,
wherein the obtaining processing includes activating an application software for the mobile terminal to obtain the machine information contained in the beacon.

14. The communication processing system according to claim 11,
wherein the working machine comprises a controller, a device to be controlled by the controller, a sensor to detect an operation condition of the device, a timer to obtain an operation time of the device, and
wherein the machine information contains the operation condition and the operation time of the device.

15. A communication processing method for a working machine, comprising:
transmitting, from a communication device disposed on the working machine, a beacon containing machine information relating to the working machine;
receiving, by a mobile terminal, the beacon to execute a connection processing for connecting the mobile terminal with the communication device and an obtaining processing for obtaining the machine information,
wherein the beacon includes a first beacon containing first activation information and a second beacon containing second activation information, and
wherein the mobile terminal is configured, after executing the connection processing and the obtaining processing upon receiving the first beacon, not to execute the obtaining processing upon further receiving the first beacon, and to execute the same obtaining processing upon receiving the second beacon; and
transmitting the second beacon when a data size of the machine information updated after the first beacon is transmitted is equal to or greater than a predetermined value.

16. The communication processing method according to claim 15, comprising:
instructing to transmit a connection request from the communication device to the mobile terminal such that the mobile terminal is connected with the communication device.

17. The communication processing method according to claim 15, comprising:
activating an application software for the mobile terminal to obtain the machine information contained in the beacon.

18. The communication processing method according to claim 15,
wherein the working machine comprises a controller, a device to be controlled by the controller, a sensor to detect an operation condition of the device, a timer to obtain an operation time of the device, and
wherein the machine information contains the operation condition and the operation time of the device.

* * * * *